United States Patent
Qiu

(10) Patent No.: US 10,694,430 B2
(45) Date of Patent: *Jun. 23, 2020

(54) SYNCHRONIZATION METHOD, COMMUNICATION HANDOVER METHOD, RADIO NETWORK AND NODE

(71) Applicant: HUAWEI TECHNOLOGIES CO., LTD., Shenzhen, Guangdong (CN)

(72) Inventor: Yong Qiu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,389

(22) Filed: Feb. 8, 2019

(65) Prior Publication Data

US 2019/0174370 A1    Jun. 6, 2019

Related U.S. Application Data

(63) Continuation of application No. 15/670,199, filed on Aug. 7, 2017, now Pat. No. 10,237,788, which is a continuation of application No. 14/551,396, filed on Nov. 24, 2014, now Pat. No. 9,730,119, which is a continuation of application No. 13/540,221, filed on Jul. 2, 2012, now Pat. No. 8,942,249, which is a continuation of application No. 12/609,363, filed on Oct. 30, 2009, now Pat. No. 8,249,020, which is a
(Continued)

(30) Foreign Application Priority Data

Apr. 30, 2007  (CN) .......................... 2007 1 0103636

(51) Int. Cl.
| | |
|---|---|
| H04L 12/28 | (2006.01) |
| H04W 36/00 | (2009.01) |
| H04W 92/04 | (2009.01) |
| H04W 36/02 | (2009.01) |
| H04J 1/16 | (2006.01) |
| H04W 92/20 | (2009.01) |

(52) U.S. Cl.
CPC ....... *H04W 36/0055* (2013.01); *H04W 36/02* (2013.01); *H04W 92/045* (2013.01); *H04W 92/20* (2013.01)

(58) Field of Classification Search
CPC ............ H04W 36/0055; H04W 36/02; H04W 92/045; H04W 92/20; H04W 36/0005
USPC ........................................ 370/252, 331, 419
See application file for complete search history.

(56) References Cited

U.S. PATENT DOCUMENTS

| | | | |
|---|---|---|---|
| 9,084,157 B2 * | 7/2015 | Zhu | H04W 36/0005 |
| 2008/0098467 A1 * | 4/2008 | Miller | H04W 76/10 |
| | | | 726/5 |

(Continued)

*Primary Examiner* — John Pezzlo

(74) *Attorney, Agent, or Firm* — Gregg L. Jansen

(57) ABSTRACT

A synchronization method, a communication handover method, a radio network, and a RAN node are disclosed. The interface information synchronization method includes determining whether a condition for initiating interface information update is fulfilled. Information about the S1 interface between the RAN node and the core network node, is sent. In addition, or alternatively, information about the X2 interface between the RAN node and the neighboring RAN node is sent to the neighboring RAN node if the condition for initiating interface information update fulfilled.

20 Claims, 5 Drawing Sheets

Related U.S. Application Data continuation of application No. PCT/CN2008/070789, filed on Apr. 24, 2008.

(56) References Cited

U.S. PATENT DOCUMENTS

| | | | | |
|---|---|---|---|---|
| 2009/0303914 A1* | 12/2009 | Gonsa | H04L 12/189 370/312 |
| 2010/0046433 A1* | 2/2010 | Iwamura | H04W 24/02 370/328 |
| 2014/0307711 A1* | 10/2014 | Kitazoe | H04W 36/0038 370/331 |

* cited by examiner

SYNCHRONIZATION METHOD, COMMUNICATION HANDOVER METHOD, RADIO NETWORK AND NODE

CROSS-REFERENCE TO RELATED APPLICATIONS

This application is a continuation of U.S. patent application Ser. No. 15/670,199, filed on Aug. 7, 2017, which is a continuation of U.S. patent application Ser. No. 14/551,396, filed on Nov. 24, 2014, now U.S. Pat. No. 9,730,119, which is a continuation of U.S. patent application Ser. No. 13/540,221, filed on Jul. 2, 2012, now U.S. Pat. No. 8,942,249, which is a continuation of U.S. patent application Ser. No. 12/609,363, filed on Oct. 30, 2009, now U.S. Pat. No. 8,249,020, which is a continuation of International Application No. PCT/CN2008/070789, filed on Apr. 24, 2008, which claims priority to Chinese Patent Application No. 200710103636.9, filed Apr. 30, 2007. All of the aforementioned patent applications are hereby incorporated by reference in their entireties.

TECHNICAL FIELD

The present application relates generally to the communication field, and in particular, to an interface information synchronization method, a communication handover method, a radio network, and a Radio Access Network (RAN) node.

BACKGROUND

The Long Term Evolution/System Architecture Evolution (LTE/SAE) network system project is the biggest new technology development project launched by the 3rd Generation Partnership Project (3GPP) in recent years. The core of such a technology is Orthogonal Frequency Division Multiplexing (OFDM)/Frequency Division Multiple Access (FDMA), and therefore, such a technology has some $4^{th}$ Generation (4G) features and is regarded as a quasi-4G technology.

FIG. 1 shows an architecture of an LTE/SAE in the conventional art. The LTE/SAE network system includes an evolved Node B (eNB) and the Mobility Management Entity/Serving System Architecture Evolution Gateway (MME/SGW) that manages the RAN nodes. The interface between the MME/SGW and the eNB is an S1 interface, and the interface between eNBs is an X2 interface.

In the current LTE, the communication handover process falls into two types: handover from a source eNB to a target eNB through an X2 interface; and handover from a source eNB to a target eNB through an S1 interface, as described below.

Handover through an X2 interface: In the handover process, the source eNB and the target eNB are governed by the same MME; the MME is unchanged; and the source eNB sends a Handover Request message to the target eNB through an X2 interface to perform handover. In this case, the handover process involves no MME, and is known as handover through an X2 interface. The handover performed through an X2 interface involves use of an S1 interface.

Handover through an S1 interface: When the MME involved in the handover process changes, namely, when the source eNB and the target eNB are not governed by the same MME, the source eNB needs to send a Handover Request message through an S1 interface, which is known as handover through an S1 interface.

When an eNB initiates handover, as regards how to select either of the foregoing handover methods, the conventional art puts forward the following eNB handover selection method:

A. If no X2 interface exists, the handover is performed through the S1 interface.

B. If the handover configured in the source eNB to the neighboring target eNB is performed through an S1 interface, the handover is performed through the S1 interface.

In this method, a static table is reserved in the source eNB first, and a decision is made about whether to perform handover through an S1 interface or an X2 interface according to the interface connection information related to the neighboring eNB and recorded in the static table. However, the conventional art describes neither the structure of such a static table nor information about how to use the static table to perform communication handover.

C. If a rejection message is received from the target eNB during the X2 interface handover, it indicates that the handover cannot be performed through an X2 interface, and therefore, the handover is performed through an S1 interface.

In this method, the Handover Request is sent through an X2 interface so long as an X2 interface connection exists. If the target eNB finds it impossible to perform handover through an X2 interface, for example, if it is determined that the same MME connection is lacking, the target eNB sends a handover failure message to the source eNB. The handover failure message carries the corresponding cause value, and instructs the source eNB to send a Handover Require message to the MME again through an S1 interface.

In the process of developing the present invention, the inventor finds at least the following defects in the conventional art.

(1) For solution B, the source eNB needs to know the static configuration of the relevant interface of the neighboring eNB. Data needs to change with the change of the configuration of the neighboring eNB. Manual modification of the static configuration consumes much time and effort, and is vulnerable to errors. Besides, the conventional art describes neither the structure of the static table nor the information about how to use the static table to perform communication handover.

(2) In solution C, for the handover which can be performed only through the S1 interface, sending a Handover Request first through the X2 interface is necessary, which wastes resources and increases delay. According to the X2 interface handover process in the conventional art, the target eNB can set up air interface resources upon receiving a Handover Request. However, if solution C is applied, the target eNB needs to judge whether X2 interface handover is practicable after receiving a Handover Request, thus increasing futile operations for the X2 interface-enabled handover processes.

SUMMARY

The present invention discloses an interface information synchronization method, a communication handover method, a radio network, and a RAN node, thus improving the efficiency of communication handover.

An interface information synchronization method is disclosed in an embodiment of the present invention. The method includes determining whether a condition for initiating interface information update is fulfilled; sending information about an S1 interface between a RAN node and a core network node, and/or information about an X2 interface between the RAN node and a neighboring RAN node to the neighboring RAN node if the condition for initiating interface information update is fulfilled.

A communication handover method is disclosed in an embodiment of the present invention. The method includes: (1) reading, by a source RAN node, a stored interface handover entries when handover occurs, where the interface handover entries include information indicating whether the handover can be performed to the target RAN node through an S1 interface, and the interface handover entries are obtained according to the S1 and/or an X2 interface information; and (2) performing the handover through the S1 interface if the interface handover entries include the information that the handover can be performed to the target RAN node through the S1 interface; otherwise, performing the handover through the X2 interface.

A communication handover method is disclosed in an embodiment of the present invention. The method includes: (1) reading, by a source RAN node, interface information when handover occurs, where the interface information includes information about whether an X2 interface exists between the source RAN node and a target RAN node and/or information about whether an S1 interface exists between a serving core network of the source RAN node and the RAN node; and (2) performing handover through the X2 interface if the interface information indicates that the X2 interface exists between the source RAN node and the target RAN node and/or the S1 interface exists between the serving core network node of the source RAN node and the target RAN node; otherwise, performing handover through the S1 interface.

A radio network is disclosed in an embodiment of the present invention. The radio network includes a first RAN node, a second RAN node, and a serving core network node of the second RAN node.

The first RAN node includes: (1) a judging unit, adapted to judge whether a condition for initiating interface information update is fulfilled; and (2) a sending unit, adapted to send information about an X2 interface between the first RAN node and the second RAN node and/or information about an S1 interface between the first RAN node and the serving core network node to the second RAN node if the condition for initiating interface information update is fulfilled.

The second RAN node includes: (1) a receiving unit, adapted to receive the S1 and/or X2 interface information; (2) a handover selecting unit, adapted to search for the interface information; if finding information about the X2 interface between the first RAN node and the second RAN node and determining that an S1 interface connection exists between the serving core network node and the first RAN node according to the S1 interface information, initiate a handover operation to the first RAN node through the X2 interface; otherwise, initiate the handover operation to the first RAN node through the S1 interface.

A RAN node is disclosed in an embodiment of the present invention. The RAN node includes: (1) a judging unit, adapted to judge whether a condition for initiating interface information update is fulfilled; and (2) a sending unit, adapted to send information about an X2 interface between the RAN node and a neighboring RAN node and/or information about an S1 interface between the RAN node and a core network node to the neighboring RAN node if the judging unit determines that the condition for initiating interface information update is fulfilled.

A RAN node is disclosed in an embodiment of the present invention. The RAN node includes: (1) a receiving unit, adapted to receive S1 and/or X2 interface information from a neighboring RAN node; (2) a processing unit, adapted to conFIG.or update the interface information of the neighboring RAN node after the receiving unit receives the S1 and/or X2 interface information; and (3) a handover selecting unit, adapted to search the processing unit for the interface information; if finding the information about the X2 interface between the RAN node and the neighboring RAN node as well as the information about the S1 interface between a serving core network node of the RAN node and the neighboring RAN node, select the X2 interface for initiating a handover operation to the neighboring RAN node; otherwise, select the S1 interface for initiating the handover operation to the neighboring RAN node.

A RAN node is disclosed in an embodiment of the present invention. The RAN node includes: (1) a receiving unit, adapted to receive S1 and/or X1 interface information from a neighboring RAN node; (2) an interface information generating unit, adapted to judge whether a core network node of the RAN node serving as a source node is the same as a core network node of the neighboring RAN node serving as a target node according to the interface information of the RAN node and the S1 and/or X1 interface information received by the receiving unit; and generate handover information indicative of handing over to the target RAN node through an S1 interface if the core network node of the RAN node serving as the source node is not same as the core network node of the neighboring RAN node serving as the target node; and (3) a handover selecting unit, adapted to search for the handover information generated by the interface information generating unit during the handover; if finding the information about the handover performed through the S1 interface to the target RAN node, select the S2 interface for initiating a handover operation to the neighboring RAN node; otherwise, select the X2 interface for initiating a handover operation to the neighboring RAN node.

As described above, in an embodiment of the present invention, the information about the S1 interface between the RAN node and the core network node, and/or information about the X2 interface between the RAN node and the neighboring RAN node is sent to the neighboring RAN node if the condition is fulfilled. When the neighboring RAN node hands over to the RAN node, the neighboring RAN node can determine whether an S1 interface exists between the neighboring RAN node itself and the core network according to its own S1 interface information and the received S1 interface information, and can accurately determine the interface available for handover according to the received X2 interface information. Therefore, the proper interface is selected accurately and quickly, the trouble of determining whether the X2 interface is available for handover in the case of unawareness of the interface information in the conventional art is avoided, the handover efficiency is improved, and the system load is reduced.

In another embodiment of the present invention, the interface information or the interface handover table is read when handover is performed; a proper interface is selected for handover according to the interface handover requirement recorded in the interface handover table or according to the interface which is determined as available for handover in view of the interface information. The determining mode is: A Handover Request is sent through the X2 interface if the interface information indicates that an X2 interface exists between the source RAN node and the target RAN node and/or an S1 interface exists between the serving core network node of the source RAN node and the target RAN node; otherwise, the Handover Request is sent through an S1 interface. Therefore, the proper interface is selected accurately and quickly. The trouble of determining whether the X2 interface is available for handover in the case of unawareness of the interface information in the conventional art is avoided, the handover efficiency is improved, and the system load is reduced.

In another embodiment of the present invention, a judging unit judges whether the interface information needs update, and a sending unit sends the interface information to the neighboring RAN node to synchronize the interface information. The handover selecting unit of the neighboring RAN node may select a proper interface for handover according to interface handover requirement recorded in the interface handover table, or according to the interface available for handover determined in view of the interface information. The determining mode is: A Handover Request is sent through the X2 interface if the interface information indicates that an X2 interface exists between the source RAN node and the target RAN node and/or an S1 interface exists between the serving core network node of the source RAN node and the target RAN node; otherwise, the Handover Request is sent through an S1 interface. Therefore, the proper interface is selected accurately and quickly. The trouble of determining whether the X2 interface is available for handover in the case of unawareness of the interface information in the conventional art is avoided, the handover efficiency is improved, and the system load is reduced.

In another embodiment of the present invention, interface information may be transmitted between neighboring RAN nodes. Therefore, the RAN node knows the interface information of the neighboring RAN node, and such interface information is a basis for selecting a specific interface for handover. The two technical solutions can work together to select a proper interface for handover accurately and efficiently, and reduce system load.

DESCRIPTION OF EMBODIMENTS

Figure 1:
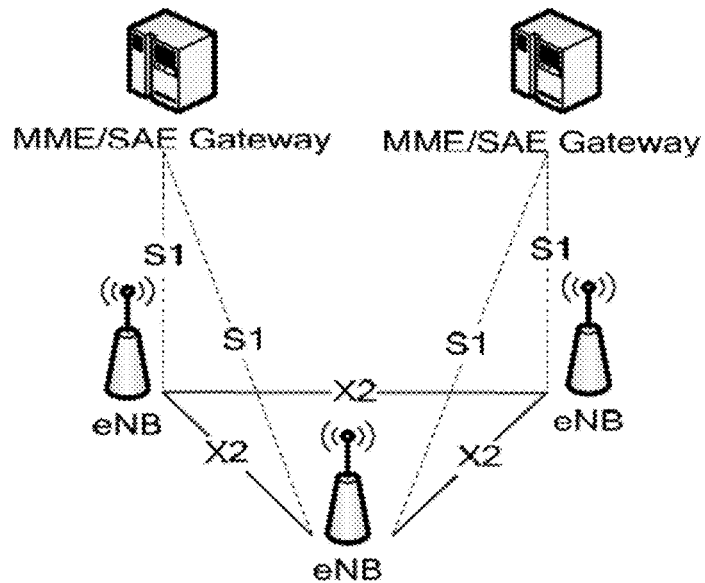
FIG. 1 shows a structure of an LTE/SAE network in the conventional art.

A communication handover method is disclosed in an embodiment of the present invention. The method includes a number of steps.

A RAN node stores the information about the X2 interface between the RAN node and a neighboring RAN node, and/or the information about the S1 interface between the neighboring RAN node and a core network node. The information about the X2 interface or the S1 interface may be interface configuration information and/or interface state information. The configuration information and/or state information constitute a configuration table (S1 or X2 interface configuration table of the RAN node).

If the S1 or X2 interface configuration/state of the RAN node changes, the RAN node sends the changed S1 or X2 interface configuration/state information to the neighboring RAN node, notifying the neighboring RAN node to modify the corresponding S1 or X2 interface configuration table.

Therefore, RAN nodes in the communication network have the latest S1 or X2 interface configuration table. When handover occurs, the source RAN node searches for the configuration information of the target RAN node in the S1 or X2 interface configuration table. A procedure is used to perform handover from a source RAN node to a target RAN node using X2 interface when S1 interface exists between the target RAN node and a serving core network node of the source RAN node. Otherwise the S1-based handover procedure is used.

A communication handover method is disclosed in an embodiment of the present invention. The method includes a number of steps.

The S1 interface information between the RAN node and the core network node is transmitted to the neighboring RAN node through an X2 interface. The neighboring RAN node generates an S1 interface handover table according to the S1 interface information of the neighboring RAN node itself and the received S1 interface information, where the S1 interface handover table indicates whether the handover is necessarily performed through the S1 interface. The S1 interface handover table is stored dynamically. Whenever the S1 interface configuration/state of the neighboring RAN node changes, the change is notified to the RAN node through the X2 interface. The RAN node modifies the S1 interface handover table according to the S1 interface information. When handover occurs, the source RAN node searches the S1 interface handover table for the target RAN node. If finding the target RAN node, the source RAN node selects the S1 interface for handover; otherwise, the source RAN node selects the X2 interface for handover.

According to the method disclosed in the embodiment of the present invention, the RAN nodes may exchange S1 interface information and/or X2 interface information automatically through automatic configuration of the network. More specifically, the interface information for exchanging is: both S1 interface information and X2 interface information; only S1 interface information; or only X2 interface information.

The RAN node may be an eNB, and the core network node may be an MME.

An interface information synchronization method is disclosed in an embodiment of the present invention. The method includes: (1) determining whether a condition for initiating interface information update is fulfilled; (2) sending information about the S1 interface between the RAN node and the core network node, and/or information about the X2 interface between the RAN node and the neighboring RAN node to the neighboring RAN node if the condition for initiating interface information update is fulfilled; (3) receiving the S1 and/or X2 interface information; and (4) configuring or updating the interface information of the neighboring RAN node according to the received S1 and/or X2 interface information.

In the embodiment described above, the S1 and/or X2 interface information of the RAN node is sent to the neighboring RAN node when the condition is fulfilled. When the neighboring RAN node hands over to the RAN node, the neighboring RAN node can determine whether an S1 interface exists between the neighboring RAN node itself and the core network according to its own S1 interface information and the received S1 interface information, and can accurately determine the interface available for handover according to the received X2 interface information. Therefore, the proper interface is selected accurately and quickly, the trouble of determining whether the X2 interface is available for handover in the case of unawareness of the interface information in the conventional art is avoided, the handover efficiency is improved, and the system load is reduced.

In the communication handover method disclosed in the embodiment of the present invention, when handover occurs, the source RAN node reads the stored interface handover table (the interface handover table includes the information indicating whether the handover can be performed through an S1 interface to the target RAN node). The source RAN node performs handover through the S1 interface if the interface handover table indicates that the handover can be performed through the S1 interface to the target RAN node; otherwise, the source RAN node performs handover through the X2 interface. Therefore, the proper interface is selected accurately and quickly. The trouble of determining whether the X2 interface is available for handover in the case of unawareness of the interface information in the conventional art is avoided, the handover efficiency is improved, and the system load is reduced.

In the communication handover method disclosed in the embodiment of the present invention, the source RAN node reads interface information when handover occurs, the interface information includes the information about whether an X2 interface exists between the source RAN node and the target RAN node and/or the information about whether an S1 interface exists between the serving core network node of the source RAN node and the target RAN node. The source RAN node performs handover through the X2 interface if the interface information indicates that an X2 interface exists between the source RAN node and the target RAN node and/or an S1 interface exists between the serving core network node of the source RAN node and the target RAN node; or else performs handover through the S1 interface. Therefore, the proper interface is selected accurately and quickly. The trouble of determining whether the X2 interface is available for handover in the case of unawareness of the interface information in the conventional art is avoided, the handover efficiency is improved, and the system load is reduced.

In the communication handover method disclosed in the embodiment of the present invention, the interface information or the interface handover table is read when handover occurs, a proper interface is selected for handover according to the interface handover requirement recorded in the interface handover table or according to the interface which is determined as available for handover in view of the interface information. The determining mode is: A Handover Request is sent through the X2 interface if the interface information includes the information about the X2 interface exists between the source RAN node and the target RAN node and the information about the S1 interface exists between the serving core network node of the source RAN node and the target RAN node; otherwise, the Handover Request is sent through an S1 interface. Therefore, the proper interface is selected accurately and quickly. The trouble of determining whether the X2 interface is available for handover in the case of unawareness of the interface information in the conventional art is avoided, the handover efficiency is improved, and the system load is reduced.

In order to make the technical solution, objectives and merits of the present invention clearer, the communication handover method under the present invention is detailed below by reference to FIG. 2.

Figure 2:
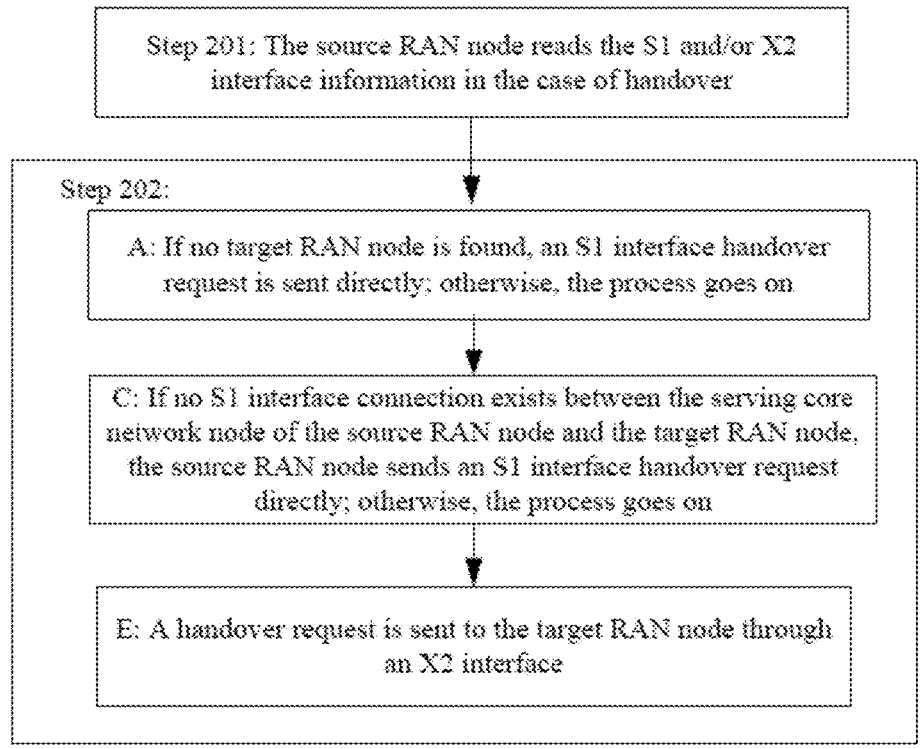
FIG. 2 is a flowchart of a communication handover method in an embodiment of the present invention.

FIG. 2 is a flowchart of a communication handover method in an embodiment of the present invention. The process includes at least the following steps.

Step 201: The source RAN node reads S1 and X2 interface information when handover occurs, the interface information includes the information about whether an X2 interface exists between the source RAN node and the target RAN node and/or the information about whether an S1 interface exists between the serving core network node of the source RAN node and the target RAN node.

As described above, the S1 and the X2 interface information may exist in the form of S1 and X2 interface configuration table, and may be stored on the source RAN node. Taking the LTE/SAE network shown in FIG. 3 as an example, RAN node 1 is adjacent to RAN nodes 2 and 3 in the network, and an X2 interface exists between them.

Table 1 is an exemplary structure of an S1 or X2 interface configuration table in the network.

Figure 3:
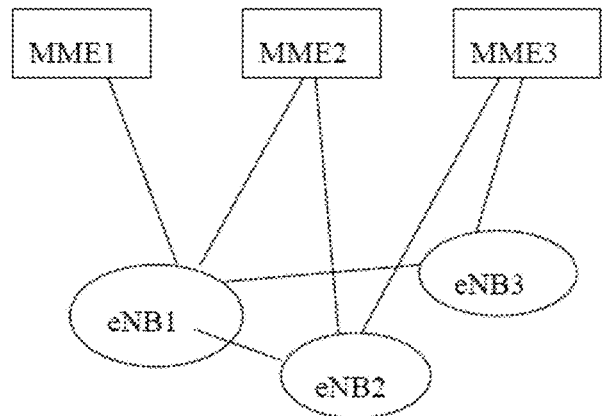
FIG. 3 shows X2 and S1 interface connections in an LTE/SAE network.

For example, in FIG. 3, RAN node 1 is adjacent to RAN nodes 2 and 3, and an X2 interface exists between them. RAN node 1 may store the following table.

TABLE 1

| S1 or X2 interface configuration table of RAN node 1 | | | |
|---|---|---|---|
| RAN node | core network node 1 | core network node 2 | core network node 3 |
| RAN node 2 | 0 | 1 | 1 |
| RAN node 3 | 0 | 0 | 1 |

The first column of the table is the information about the neighboring RAN node. The first column includes RAN node 2 and RAN node 3. An X2 interface exists between RAN node 1 and RAN nodes 2 and 3. If the column has no name of a RAN node, it indicates that no X2 interface exists between RAN node 1 and the RAN node.

The first row of the table indicates the relevant core network nodes, and the content below the second row indicates whether an S1 interface exists between each neighboring RAN node and the relevant core network node. "1" indicates that an S1 interface exists between a RAN node and the relevant core network node; and "0" indicates that no S1 interface exists between them. The foregoing table reveals a number of facts. An S1 interface exists between RAN node 2 and core network nodes 2 and 3, but no S1 interface exists between RAN node 2 and core network node 1. In addition, an S1 interface exists between RAN node 3 and core network node 3, but no S1 interface exists between RAN node 3 and core network node 1 or 2.

In this case, when the source RAN node knows existence of an S1 interface between the source RAN node and the relevant core network node, according to the second row and the content below the second row, the source RAN node may infer whether an S1 interface exists between the serving core network of the source RAN node and other neighboring RAN nodes. For example, if RAN node 2 and the serving core network node 2 of RAN node 1 correspond to the position "1" in the table but RAN node 1 already knows that an S1 interface exists between RAN node 1 and core network node 2, it is inferred that an S1 interface exists between RAN node 1 and the serving core network node 2 of RAN node 2.

Obviously, the first column of the table indicates whether an X2 interface exists between the source RAN node and other neighboring RAN nodes. The second row of the table indicates whether an S1 interface connection exists between the neighboring RAN node and the core network node. The source RAN node may infer whether an S1 interface exists between the serving core network node of the source RAN node and the neighboring RAN node according to the S1 interface information of the source RAN node and the S1 interface information below the second row in the table.

Likewise, other neighboring RAN nodes also store similar configuration tables for communication handover. Table 2 and Table 3 are examples.

TABLE 2

S1 or X2 interface configuration table of RAN node 2

| RAN node | Core network node 1 | Core network node 2 | Core network node 3 |
|---|---|---|---|
| RAN node 1 | 1 | 1 | 0 |

TABLE 3

S1 or X2 interface configuration table of RAN node 3

| RAN node | core network node 1 | core network node 2 | core network node 3 |
|---|---|---|---|
| RAN node 1 | 1 | 1 | 0 |

Nevertheless, the RAN node may also add its own S1 interface information into the first row of the foregoing configuration table. The second row and the content below it are the information about the neighboring RAN node, as shown in Table 4.

TABLE 4

S1 or X2 interface configuration table of RAN node 1

| RAN node | Core network node 1 | Core network node 2 | Core network node 3 |
|---|---|---|---|
| RAN node 1 | 1 | 1 | 0 |
| RAN node 2 | 0 | 1 | 1 |
| RAN node 3 | 0 | 0 | 1 |

In this way, according to the information in Table 4, when RAN node 1 serves as a source RAN node, it is easy to determine whether an S1 interface exists between the source RAN node and a core network node, and whether an S1 interface exists between another neighboring RAN node and the core network node.

When handover needs to occur on the source RAN node, the source RAN node reads the S1 and X2 interface configuration table stored locally first, and then performs the following steps.

Step 202: If the interface configuration table includes the information about the X2 interface exists between the source RAN node and the target RAN node and the information about the S1 interface exists between the serving core network node of the source RAN node and the target RAN node, the source RAN node sends a Handover Request to the target RAN node through the X2 interface; otherwise, the source RAN node sends a Handover Request to the target RAN node through the S1 interface.

In practice, the details of this step are as follows.

A. If no target RAN node is found in the first column of the interface configuration table, it indicates that no X2 interface exists between the source RAN node and the target RAN node, and the source RAN node sends a Handover Request message of the S1 interface directly. If a target RAN node is found, it indicates that an X2 interface exists between the source RAN node and the target neighboring RAN node, and the process proceeds to step C.

C. The second row and the rows below it in the interface configuration table are searched for the "target RAN node" row and the "serving core network node of the source RAN node" row to check the value at the intersection between such a row and the column. If the value is "0," it indicates that no S1 interface exists between the serving core network node of the source RAN node and the target RAN node, and the source RAN node sends the Handover Request message of the S1 interface directly. If the value is "1," it indicates that an S1 interface exists between the serving core network node of the source RAN node and the target RAN node, and the process proceeds to step E.

E. Through an X2 interface, a Handover Request is sent to the target RAN node.

As revealed in the foregoing description, the RAN node in the radio network judges whether an S1 interface exists between the RAN node and the core network according to the S1 interface information of the RAN node and the received S1 interface information, and can select a proper interface accurately and quickly according to the received X2 interface information. Therefore, the trouble of determining whether the X2 interface is available for handover after receiving a Handover Request in the conventional art is avoided, the handover speed is improved, and the system load is reduced.

If an S1 interface exists between the serving core network node of the source RAN node and the target RAN node, and if an X2 link exists between the source RAN node and the target RAN node but the X2 link disconnected, then the handover fails if the Handover Request is sent through the X2 interface directly. Therefore, this step is added to judge the X2 interface link state first. If the X2 interface link state is abnormal, the Handover Request is sent through an S1 interface, thus improving the handover success ratio.

For that purpose, a state value is added on the basis of the S1 or X2 interface configuration table to indicate whether the X2 or S1 interface links are normal. Specifically, a parameter may be added to indicate whether the link is available or existent. Table 5 gives an example.

TABLE 5

S1 or X2 interface configuration table on RAN node 1

| RAN node | core network node 1 | core network node 2 | core network node 3 | X2 |
|---|---|---|---|---|
| RAN node 2 | 0 | 1 | 2 | 1 |
| RAN node 3 | 0 | 0 | 1 | 2 |

In Table 5, the "X2" column is additional, the "0" value indicates that no link exists, "1" indicates normal, and "2" indicates link failure. The parameters in Table 5 mean that:

The X2 link between RAN node 1 and RAN node 2 is normal; the X2 link between RAN node 1 and RAN node 3 is unavailable; no S1 connection exists between RAN node 2 and core network node 1, the S1 connection between RAN node 2 and core network node 2 is normal, and the S1 connection between RAN node 2 and core network node 3 is unavailable; and the X2 link between RAN node 1 and RAN node 3 is unavailable.

In other embodiments, the "X2" column may exist in another table. The "X2" column is optional, and is useful in step 201.

When the S1 and X2 interface configuration table in Table 5 is in use, if a target RAN node is found in the first column of the S1 and X2 interface configuration table in step A, step B may be performed before step C.

B. The first column of the S1 and X2 interface configuration table is searched for the target RAN node. If a target RAN node is found, the value in the "X2" column of the S1 and X2 interface configuration table is looked up. If the X2 link is found to be unavailable, a Handover Request message is sent through the S1 interface; otherwise, the process proceeds to step C and then to step D.

D. It is judged whether S1 connection state of the target RAN node is normal. If the S1 connection state of the target RAN node is normal, a Handover Request is sent through the X2 interface to perform handover; otherwise, a Handover Request message is sent through the S1 interface to perform handover.

For example, when source RAN node 1 needs to hand over to target RAN node 2, source RAN node 1 searches Table 5. If the X2 state value is "1," it indicates that the X2 link is normal. Afterward, the state of the core network node connected with RAN node 2 is checked. If the state value of core network node 2 is "1," it indicates that the S1 link is normal, and the handover is performed through the X2 interface.

In other embodiments, an additional option may be set in the S1 or X2 interface configuration table to indicate whether the handover needs to be performed through the S1 interface or the X2 interface. If the S1 and X2 interface configuration table includes the information about the X2 interface between the source RAN node and the target RAN node and the information about the S1 interface between the serving core network node of the source RAN node and the target RAN node, information is set to indicate that the handover needs to be performed through the X2 interface; otherwise, information is set to indicate that the handover needs to be performed through the S1 interface.

Alternatively, a simpler S1 interface handover table is generated dynamically on the basis of the S1 or X2 interface configuration table. The S1 interface handover table indicates whether the handover to the target RAN node needs to be performed through the S1 interface. The S1 interface handover table directly decides whether the S1 interface handover process or the X2 interface handover process applies.

The S1 interface handover table falls into the following two types, as described below.

(1) The S1 interface handover table includes MME and S1 interface options.

In the S1 or X2 interface configuration table, if the S1 interface link of the serving MME of the source RAN node in Table 1 or Table 5 is already configured, or if the S1 interface is in the available state, information needs to be set in the S1 interface handover table to indicate that the handover to the target RAN node needs to be performed through the S1 interface, as detailed in Table 6.

TABLE 6

Interface handover Table 1

| Core network node | RAN node 2 | RAN node 3 |
|---|---|---|
| MME1 | 1 | 1 |
| MME2 | 0 | 1 |

In Table 6, if an S1 interface connection exists between the serving core network node of the source RAN node and the target RAN node, the value of the S1 handover option in the interface handover table is 0, indicating that the handover needs to be performed through the X2 interface instead of the S1 interface; otherwise, the value is 1, indicating that the handover needs to be performed through the S1 interface. The S1 interface link state may be considered at the same time. For example, when the S1 interface link state is normal, the value of the option is 0; otherwise, the value of the option is 1.

For the purpose of handover, this table may be searched for the value corresponding to the target RAN node and the serving core network node of the source RAN node, and the handover selection is made according to such a value directly, without the need of searching the S1 or X1 interface configuration table.

Table 6 may be generated by reference to Table 5. After receiving the X2 or S1 interface information of the neighboring RAN node, the source RAN node generates an X2 or S1 interface configuration table described above, and then generates an S1 interface handover table (as shown in Table 6) according to whether an S1 interface connection exists between the source RAN node and the serving core network node of the source RAN node. That is, if the state indicated in the "core network node" column in Table 5 is "available," the handover needs to be performed through the X2 interface; otherwise, the handover needs to be performed through the S1 interface.

(2) The interface handover table includes only the S1 interface option.

This solution is similar to solution (1), but differs in that: The interface handover table includes only the S1 interface option of different core network nodes between two RAN nodes, and is simpler. The principles are as follows.

It is assumed that all MMEs connected to the same RAN node are in the same MME pool, and different MME pools are never connected to the same RAN node. Although an X2 interface exists between two RAN nodes, they are connected to two MME pools, and the handover between them needs to be performed through the S1 interface. An interface handover table may be configured, and such RAN nodes are put into the table. The RAN node in such an interface handover table needs to hand over through an S1 interface.

The interface handover table is set in the following way.

I. The S1 interface information of the target RAN node needs to be obtained first. Through an X2 interface, the target RAN node sends the S1 interface information of the S1 interface between the target RAN node and one MME/multiple MMEs/all MMEs to the source RAN node.

II. According to the S1 interface information of the target RAN node and the S1 interface information of the source RAN node, determining whether both the source RAN node and the target RAN node are connected to the same core network node through an S1 interface.

If the source RAN node and the target RAN node are not connected to the same core network node through an S1 interface, it is only necessary to set information in the interface handover table to indicate that the handover to the target RAN node needs to be performed through an S1 interface.

After receiving the S1 interface information, the source RAN node compares the received S1 interface information with its own S1 interface information. If one MME/multiple MMEs/all MMES are the same, it indicates that the source RAN node and the target RAN node are in the same MME pool; otherwise, it indicates that the source RAN node and the target RAN node are not in the same MME pool. The RAN nodes not in the same MME pool are put into the interface handover table. The S1 information includes configuration information, and optionally, link state information. As shown in Table 7, RAN node 2 and the source RAN node are not in the same MME pool.

TABLE 7

Interface handover Table 2

| Target RAN node | State |
| --- | --- |
| eNB2 | 1 |

Figure 4:
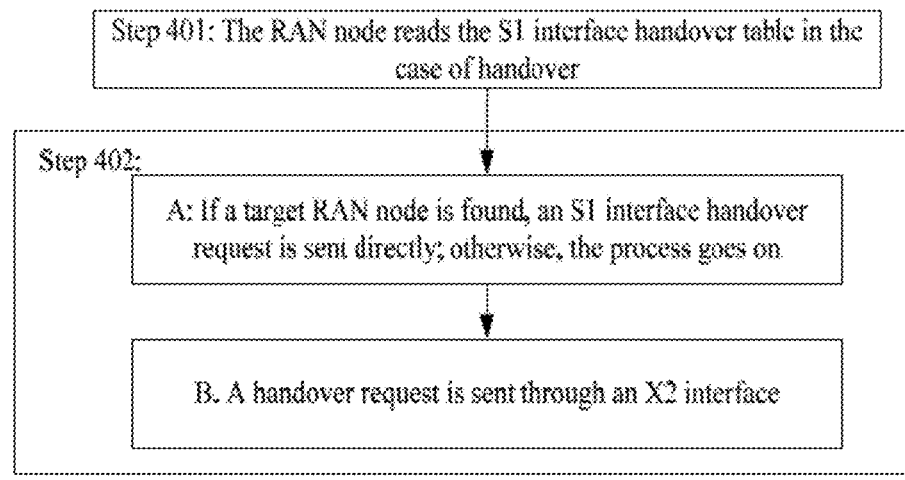
FIG. 4 is a flowchart of interface information synchronization method in another embodiment of the present invention.

The communication handover method under the present invention is detailed below by reference to FIG. 4. As shown in FIG. 4, the communication handover process includes at least the following steps.

Step 401: The source RAN node searches the interface handover table.

Step 402: A. If the interface handover table includes a target RAN node or the link state is normal, the handover is performed through the S1 interface.

B. Otherwise, an attempt is made to hand over through an X2 interface; or, if the link state is abnormal, handover failure is fed back directly.

If more state information exists in Table 7, and if the state information indicates link normal, the handover is performed through the S1 interface. This state information is optional.

Figure 5:
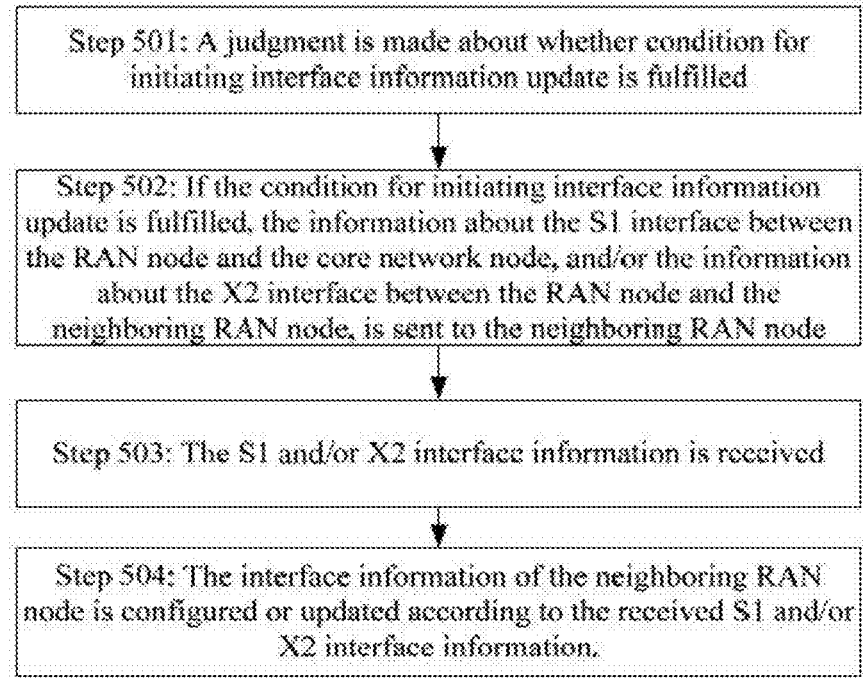
FIG. 5 is a flowchart of a communication handover method in an embodiment of the present invention.

If the S1 or X2 interface of the RAN node changes, a notification needs to be sent to the neighboring RAN node to let the neighboring RAN node update the S1 or X2 interface configuration table. Therefore, an interface information synchronization method in the second embodiment of the present invention is put forward. As shown in FIG. 5, the method includes the following steps.

Step 501: A judgment is made about whether a condition for initiating interface information update is fulfilled.

In this embodiment, a judgment is made about whether the configuration and/or the state of the S1 interface and/or the X2 interface of the RAN node has changed.

Step 502: If the condition for initiating interface information update is fulfilled, the information about the S1 interface between the RAN node and the core network node, and/or the information about the X2 interface between the RAN node and the neighboring RAN node, is sent to the neighboring RAN node.

When the configuration and/or the state of the S1 interface and/or the X2 interface of the RAN node changes (for example, the RAN node is connected to another core network node, or the S1 interface configuration changes, or the address of the X2 interface to the neighboring RAN node changes, or the configuration of both the S1 interface and the X2 interface changes), a message is sent to the neighboring RAN node through the X2 interface, where the message carries the information about the S1 interface and/or the X2 interface of the RAN node.

The information about the S1 interface and/or the X2 interface of the RAN node may be a special signaling (such as a Config Info message) sent to neighboring RAN node 1, or may be added into another automatic configuration message sent to neighboring RAN node 1.

The information about the S1 interface and/or the X2 interface of the RAN node includes: information about the X2 interface between the RAN node and the neighboring RAN node, and/or information about the S1 interface between the RAN node and the core network node.

The information about the S1 interface and/or the X2 interface of the RAN node may include the information indicating whether the S1 interface and/or the X2 interface between the RAN node and the neighboring RAN node is available, for example, the parameter indicative of the state in the S1 and X2 interface configuration table in Table 5.

Step 503: The neighboring RAN node receives the S1 and/or X2 interface information.

Step 504: The neighboring RAN node configures or updates the interface information of the neighboring RAN node according to the received S1 and/or X2 interface information.

In this step, after the neighboring RAN node receives the S1 and/or X2 interface information, the neighboring RAN node configures the interface information if no old interface information exists; or updates the interface information if old interface information already exists.

The foregoing description reveals that: The RAN node in the radio network notifies the latest S1 and/or X2 interface information to the neighboring RAN node automatically when a certain condition is fulfilled. Therefore, the neighboring RAN node keeps aware of the latest X2 interface information and the S1 interface information of the neighboring RAN node. The interface is determined according to the latest S1 and/or X2 interface information so that the handover operation is performed quickly. The high costs and low efficiency caused by static configuration and manual modification of the RAN node interface information in the conventional art are overcome, the trouble of determining whether the X2 interface is available for handover in the conventional art is avoided, the handover speed is improved, and the system load is reduced.

Besides, the RAN node can also receive the interface information of the neighboring RAN node. The interface information includes: the information about the S1 interface between the neighboring RAN node and the core network node, and/or the information about the X2 interface between the neighboring RAN node and the RAN node.

Therefore, the RAN node not only sends interface information to other RAN nodes, but also receives interface information from other RAN nodes as a basis for selecting the interface for handover. If the present invention is applied to all the RAN nodes in the radio network, the RAN nodes exchange the latest S1 and/or X2 interface information, and any RAN node knows whether to use the X2 interface or the S1 interface for handover to the target RAN node, thus improving the handover efficiency, avoiding handover failure, and avoiding the interface test operation.

Meanwhile, with the S1 and/or X2 link state being known, the selection of the handover request is more accurate and the handover success ratio is higher.

It is worthy of attention that when the S1 or S2 configuration of the RAN node changes, all neighboring RAN nodes can be notified through the X2 interface message anytime. After the interface information of the neighboring RAN node is configured or updated, the following operations are performed.

The S1 interface handover table is obtained through calculation according to the interface information of the neighboring RAN node. The S1 interface handover table includes the information about selecting an S1 or X2 interface for communication handover. In this way, the interface for handover is determined more quickly, and the speed of the handover operation is improved.

In the interface information synchronization method provided in the embodiment of the present invention, the judgment about whether the condition of initiating interface information update is fulfilled in step 501 may be A, B, C, D, E, or F described below:

A. A judgment is made about whether the timer of the S1 and/or X2 interface information of the RAN node expires.

All the RAN nodes exchange information with each other periodically. For example, a timer is set on the S1 and/or X2 interface information. Moreover, before the interface information is sent, a judgment may be made about whether the S1 and/or X2 interface information or the link state of the RAN node changes; if the interface information or the link state changes, the neighboring RAN node is notified through a message; otherwise, the neighboring RAN node is not notified. Alternatively, no judgment is made, and the interface information is sent upon expiry of the timer.

B. A judgment is made about whether a message that the neighboring RAN node requests the S1 and/or X2 interface information is received.

The RAN node may request the latest S1 and X2 interface information periodically from the neighboring RAN node through the X2 interface. Upon expiry of the timer of the RAN node, the RAN node requests the X2 and S1 interface information from the neighboring RAN node.

C. A judgment is made about whether the X2 handover operation initiated by the RAN node to the neighboring RAN node fails. For ease of description, the foregoing two nodes are called "source RAN node" and "target RAN node" respectively in the handover process described below.

If the source RAN node searches the S1 and X2 interface configuration table and decides to perform handover through an X2 interface, the target RAN node may find that its own S1 interface link is disconnected after sending a Handover Request message. In this case, the target RAN node sends a Handover Failure message to the source RAN node. The S1 and X2 interface configuration table may be sent together with the Handover Failure message; or the target RAN node gives a cause value, and the source RAN node requests the new S1 and X2 interface configuration table from the target RAN node. Alternatively, if the S1 interface of the target RAN node is unavailable, the core network node sends configuration table information about the S1 interface to the source RAN node.

When the handover operation fails, the S1 and X2 interface information may be sent in the following way in step 502.

The Handover Failure response returned to the source RAN node carries the S1 and/or X2 interface information of the target RAN node.

Alternatively, the Handover Failure response returned to the source RAN node carries the failure cause, and the source RAN node analyzes the cause value after receiving the failure cause. If the failure cause is radio resource allocation failure, it indicates that the handover fails. If the S1 interface of the target RAN node is not configured or is unavailable, the source RAN node sends a request message, which requires the target RAN node to send an S1 and/or X2 interface information message. The target RAN node sends its S1 and/or X2 interface information to the source RAN node.

Alternatively, the Handover Failure response returned to the source RAN node carries the failure cause. After the source RAN node receives the failure cause, if the failure cause is lack of an S1 interface connection between the target RAN node and the core network node, the source RAN node requests the S1 and X2 interface configuration information of the target RAN node from the core network node. If the target S1 interface configuration recovers to normal, the handover may be performed through the X2 interface, but the source RAN node is still unaware of it. The source RAN node sends an S1 interface Handover Request to the MME first. After receiving the Handover Request, the MATE finds that the MATE of the target RAN node is the same as that of the source RAN node. Therefore, the MATE may also trigger the source RAN node to modify the configuration information of the target RAN node, or notify the target RAN node to send the S1 interface configuration information to the source RAN node. After receiving the S1 interface configuration information of the target RAN node, the source RAN node modifies the X2 and S1 configuration table.

If the source RAN node searches the S1 and X2 interface configuration table and decides to perform handover through an X2 interface, the target RAN node may find that its own S1 interface link is disconnected after sending a Handover Request message. In this case, the target RAN node sends a Handover Failure message to the source RAN node. The S1 and X2 interface configuration table may be sent together with the Handover Failure message; or the target RAN node gives a cause value, and the source RAN node requests the new S1 and X2 interface configuration table from the target RAN node. Alternatively, if the S1 interface of the target RAN node is unavailable, the core network node sends configuration table information about the S1 interface to the source RAN node.

Figure 6:
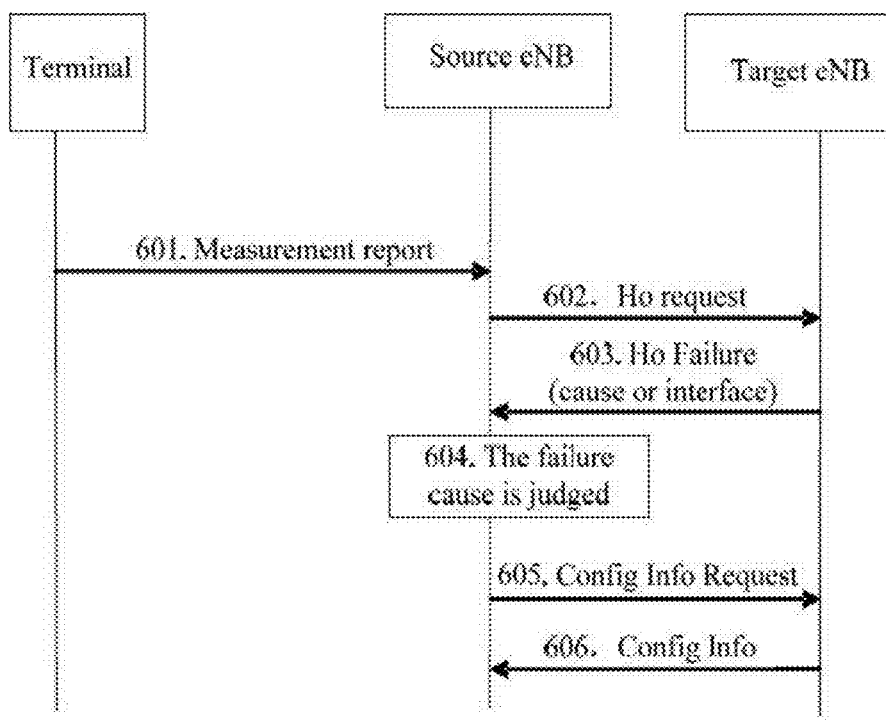
FIG. 6 is a signaling flowchart of interface information synchronization method in another embodiment of the present invention.

FIG. 6 is a flowchart of interface information synchronization method in an embodiment of the present invention. As shown in FIG. 6, the interface information synchronization method of the source RAN node includes at least the following steps.

Step 601: The terminal submits a measurement report.

Step 602: After the source RAN node receives the measurement report, if the source RAN node decides to hand over and an X2 interface connection exists, the source RAN node sends a Handover Request to the target RAN node through an X2 interface.

Step 603: If the target RAN node finds that the S1 interface is disconnected or the radio resource allocation fails, namely, if the handover fails and the condition for initiating interface information update is fulfilled, the target RAN node returns a Handover Failure message to the source RAN node. In this case, the Handover Failure message may carry a failure cause value. If the handover fails because no S1 interface is configured or the S1 interface is unavailable, the Handover Failure message may carry an S1 and X2 interface configuration table.

The cause value here may be: lack of configuring the S1 interface of the target RAN node, unavailable S1 state, radio resource allocation failure, NAS error, transmission channel error, or protocol failure.

Step 604: After receiving the Handover Failure message, the source RAN node judges the failure cause according to the cause value. If the handover fails because no S1 interface is configured or the S1 interface is unavailable, and if the Handover Failure message carries a configuration table, the source RAN node updates the S1 and X2 interface configuration table on the source RAN node directly according to the configuration table. Otherwise, the process proceeds to step 605 if the Handover Failure message carries no configuration table and indicates only the S1 configuration error, and if the cause value is that no S1 interface is configured or the S1 interface is unavailable. If the handover fails due to radio resource allocation failure, the process is ended.

Step 605: Through an X2 interface, the source RAN node sends a message (such as Config Info Request message) to the target RAN node, requesting new X2 and S1 interface information.

Step 606: The information about the S1 interface between the target RAN node and the core network node and/or the information about the X2 interface between the target RAN node and the source RAN node is sent to the source RAN node.

In this step, after receiving the message (such as Config Request message), the target RAN node sends a new configuration information table (such as Config Info message) to the source RAN node.

Figure 7:
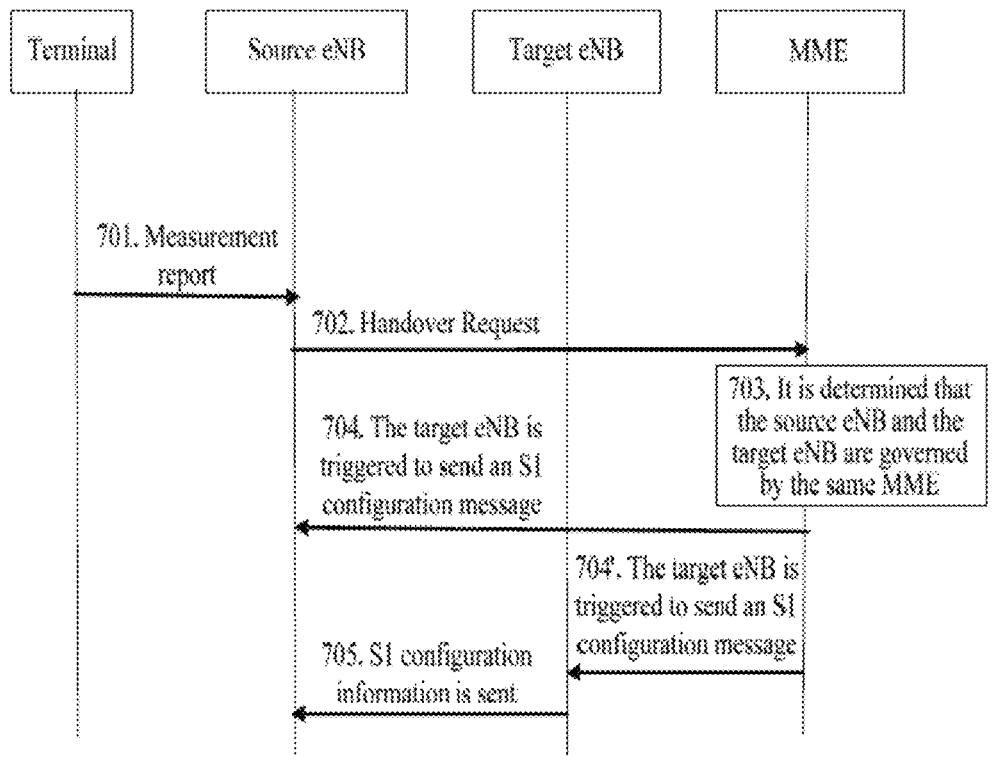
FIG. 7 is a signaling flowchart of interface information synchronization method in another embodiment of the present invention.

FIG. 7 is a flowchart of interface information synchronization method in another embodiment of the present invention. As shown in FIG. 7, the interface information synchronization method of the source RAN node includes at least the following steps:

Step 701: The terminal submits a measurement report.

Step 702: After the source RAN node receives the measurement report, if the source RAN node decides to hand over, the source RAN node reads the S1 and X2 interface configuration table and then decides to initiate handover to the target RAN node through an S1 interface.

Step 703: The MME receives the Handover Request and judges whether the condition for initiating interface information update is fulfilled. That is, the MME judges whether an S1 interface connection exists between the target RAN node and the core network node, and between the source RAN node and the core network node. If it is determined that target RAN node and the source RAN node are governed by the same MME, the source RAN node is notified to update the S1 configuration information of the target RAN node. The process proceeds to step 704 or step 704', in which the S1 and/or X2 interface information of the target RAN node is sent to the source RAN node.

Step 704: The MME sends the S1 interface information of the target RAN node to the source RAN node, where the S1 interface information may be sent in an independent message or carried in the Handover Response message in the handover process; or Step 704': The MME sends a message to the target RAN node, thus initiating the target RAN node to send S1 interface information to the source RAN node, where the S1 interface information may be sent in an independent message or carried in the Handover Response message in the handover process.

Step 705: The source RAN node modifies the X2 and S1 interface configuration table or the S1 interface handover table.

D. A judgment is made about whether the RAN node is restarted.

E. A judgment is made about whether the Element Manager System (EMS) of the RAN node has modified the interface information of the RAN node.

In this case, the process of sending the information about the S1 interface and/or the X2 interface to the neighboring RAN node includes the following steps.

The EMS of the RAN node sends a message that carries the modified S1 and/or X2 interface information to the EMS that governs the neighboring RAN node.

Figure 8:
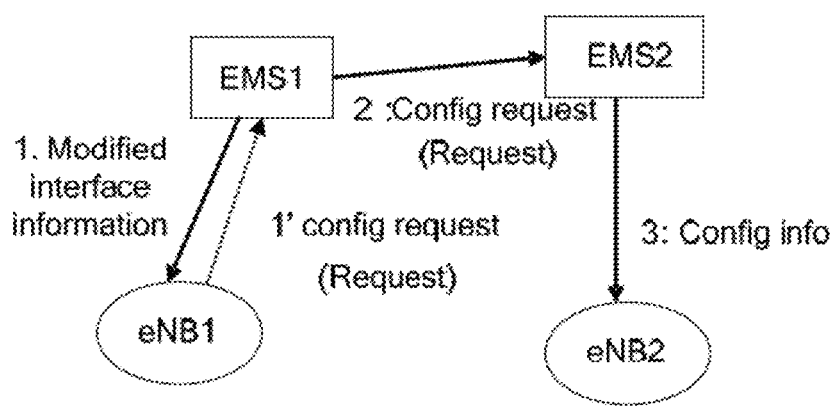
FIG. 8 is a signaling flowchart of interface information synchronization method in another embodiment of the present invention.

FIG. 8 is a flowchart of interface information synchronization method in another embodiment of the present invention. As shown in FIG. 8, when the configuration changes, the change may be notified to the neighboring RAN node Network Management System (NMS) through a message, and the neighboring RAN node NMS notifies the change to the neighboring RAN node. This method includes at least the following steps.

Step 801: A judgment is made about whether a condition for initiating interface information update is fulfilled.

If the configuration table of RAN node 1 is changed through modification of EMS1, a Config Modified message is sent to RAN node 1. After receiving the Config Modified message, RAN node 1 updates the stored S1 and X2 interface configuration table. The process proceeds to step 804.

Alternatively, if the configuration table of RAN node 1 changes, the information about the S1 interface between RAN node 1 and the core network node and/or the information about the X2 interface between RAN node 1 and the neighboring RAN node are sent to RAN node 2 through an EMS, as detailed below.

Step 802: EMS1 is notified through a Config Request message.

Step 803: After receiving the Config Request message, EMS1 modifies the corresponding configuration.

Step 804: EMS1 sends a Config Request that carries S1 and/or X2 interface information to the neighboring EMS2. EMS2 modifies the corresponding configuration table according to the S1 and/or X2 interface information.

Step 805: EMS2 notifies RAN node 2 through a Config Info message that carries the S1 and/or X2 interface information.

Step 806: RAN node 2 modifies the corresponding configuration table according to the S1 and/or X2 interface information.

F. When S1 interface handover occurs and the core network node receives Handover Request message of the source RAN node, a judgment is made about whether the target RAN node and the source RAN node are connected to the same core network. If such is the case, the S1 interface information of the target RAN node is sent to the source RAN node; or the target RAN node is triggered to send S1 interface information to the source RAN node.

Figure 9:
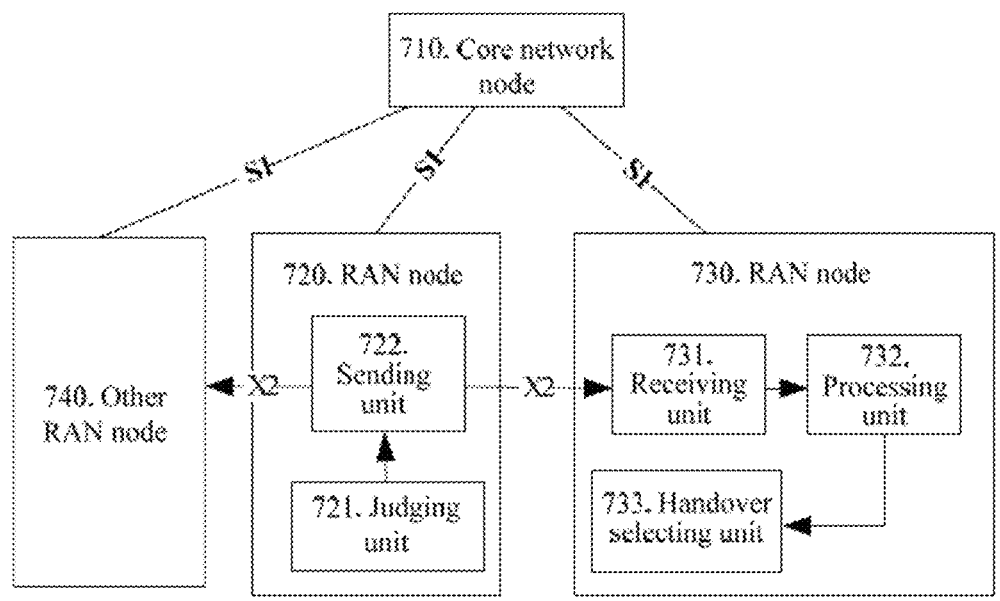
FIG. 9 shows a structure of a radio network in an embodiment of the present invention.

FIG. 9 shows a structure of a radio network in an embodiment of the present invention. As shown in FIG. 9, the radio network includes a core network node 710 and neighboring RAN nodes 720, 730, and 740. The RAN node 720 includes: (1) a judging unit 721, adapted to judge whether a condition for initiating interface information update is fulfilled; and (2) a sending unit 722, adapted to: send the information about the S1 interface between the RAN node 720 and the core network node 710, and/or the information about the X2 interface between the RAN node 720 and the neighboring RAN node 730 to the neighboring RAN node 730 if the condition for initiating interface information update is fulfilled.

The neighboring RAN node 730 includes: (1) a receiving unit 731, adapted to receive the S1 and/or X2 interface information; (2) a processing unit 732, adapted to conFIG.or update the interface information of the neighboring RAN node 730 according to the received S1 and/or X2 interface information; and (3) a handover selecting unit 733, adapted to: search the processing unit 732 for the interface information; if finding information about the X2 interface between the two neighboring RAN nodes and determining that an S1 interface connection exists between the serving core network node 710 of the source neighboring RAN node 720 and the neighboring RAN node 730 which serves as a target node according to the S1 interface information, select the X2 interface to initiate a handover operation; otherwise, select the S1 interface to initiate a handover operation.

The foregoing description reveals a number of things. The judging unit 721 in the radio network judges whether the interface information of the RAN node needs to be updated. If the interface information needs to be updated, the RAN node notifies the latest S1 and/or X2 interface information to the neighboring RAN node 730 automatically. Therefore, the neighboring RAN nodes 730 and 740 keep aware of the latest X2 interface information and S1 interface information of the neighboring RAN nodes 730 and 740. The interface is determined according to the latest S1 and/or X2 interface information so that the handover operation is performed quickly. The high costs and low efficiency caused by static configuration and manual modification of the RAN node interface information in the conventional art are overcome, the trouble of determining whether the X2 interface is available for handover in the conventional art is avoided, the handover speed is improved, and the system load is reduced.

The judging unit 721 is adapted to: (1) judge whether the configuration and/or the state of the S1 interface and/or the X2 interface of the RAN node 720 has changed; or (2) judge whether the timer of the S1 and/or X2 interface information of the RAN node 720 expires; or (3) judge whether a message that the neighboring RAN node 730 requests the S1 and/or X2 interface information is received; or (4) judge whether the X2 handover operation initiated by the neighboring RAN node 730 to the RAN node 720 fails; or (5) judge whether the RAN node 720 is restarted; or (6) judge whether the EMS of the RAN node 720 has modified the interface information of the RAN node 720.

As shown in FIG. 9, a RAN node is disclosed in an embodiment of the present invention. The RAN node 720 includes: (1) a judging unit 721, adapted to judge whether a condition for initiating interface information update is fulfilled; and (2) a sending unit, adapted to: send the information about the S1 interface between the RAN node 720 and the core network node, and/or the information about the X2 interface between the RAN node 720 and the neighboring RAN node 730 to the neighboring RAN node 730 if the condition for initiating interface information update is fulfilled.

The RAN node 720 may further receive the interface information of the neighboring RAN node 730. The interface information includes the information about the S1 interface between the neighboring RAN node 730 and the core network node, and/or the information about the X2 interface between the neighboring RAN node 730 and the RAN node 720. In this case, the RAN node 720 may further include a handover selecting unit (not illustrated in the figure), which is adapted to search for the interface information. If finding the information about the X2 interface between the RAN node 720 and the neighboring RAN node 730 as well as the information about the S1 interface between the serving core network node 710 of the RAN node 720 and the neighboring RAN node 730 which serves as a target node, the RAN node 720 selects the X2 interface for initiating a handover operation; otherwise, select the S1 interface for initiating a handover operation.

Figure 10:
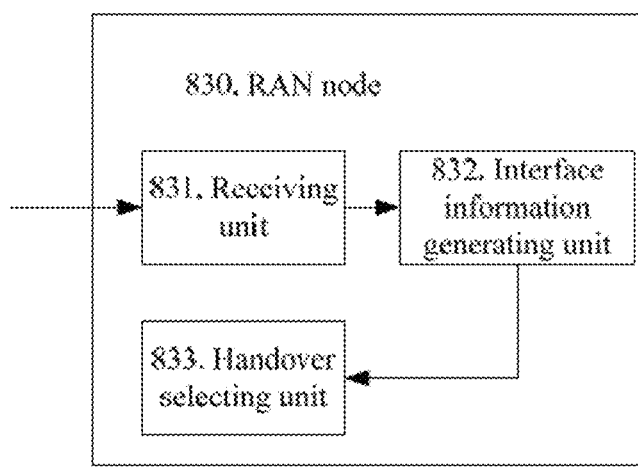
FIG. 10 shows a structure of a RAN node in an embodiment of the present invention.

As shown in FIG. 10, a RAN node is disclosed in another embodiment of the present invention. The RAN node 730 includes: (1) a receiving unit 731, adapted to receive the S1 and/or X2 interface information from the neighboring RAN node 720; (2) a processing unit 732, adapted to conFIG.or update the interface information of the neighboring RAN node 720 according to the received S1 and/or X2 interface information; and (3) a handover selecting unit 733, adapted to: search the processing unit 732 for the interface information; if finding the information about the X2 interface between the RAN node 730 and the neighboring RAN node 720 as well as the information about the S1 interface between the serving core network node 710 of the RAN node 730 and the neighboring RAN node 720 which serves as a target node, select the X2 interface for initiating a handover operation; otherwise, select the S1 interface for initiating a handover operation.

As shown in FIG. 8, a RAN node 830 is disclosed in the third embodiment of the RAN node of the present invention. The RAN node 830 includes: (1) a receiving unit 831, adapted to receive the S1 interface information from the neighboring RAN node; (2) an interface information generating unit 832, adapted to: judge whether the same core network node exists between the RAN node 830 which serves as a source node and the neighboring RAN node which serves as a target node according to the S1 interface information of the interface information generating unit 832 and the S1 interface information received by the receiving unit 831; and generate handover information indicative of handing over to the target RAN node through an S1 interface if the same core network node does not exist; and (3) a handover selecting unit 833, adapted to: search for the handover information generated by the interface information generating unit 832 during the handover; if finding the information about the handover performed through the S1 interface to the target RAN node, select the S1 interface for initiating a handover operation to the neighboring RAN node; otherwise, select the X2 interface for initiating a handover operation to the neighboring RAN node.

The first, second, and third embodiments of the RAN node described above may be applied to the embodiments of the interface information synchronization method and the communication handover method, and can support the X2 and S1 interface information synchronization function and the communication handover function performed according to the X2 and S1 interface information. The high costs and low efficiency caused by static configuration and manual modification of the RAN node interface information in the conventional art are overcome, the trouble of determining whether the X2 interface is available for handover in the conventional art is avoided, the handover speed is improved, and the system load is reduced.

It is understandable to those skilled in the art that all or part of the steps of the foregoing embodiments may be implemented by hardware instructed by a program. The program may be stored in a computer-readable storage medium. When being executed, the program performs these steps: (1) determining whether a condition for initiating interface information update is fulfilled; (2) sending information about the S1 interface between the RAN node and the core network node, and/or information about the X2 interface between the RAN node and the neighboring RAN node to the neighboring RAN node if the condition for initiating interface information update is fulfilled; (3) receiving the S1 and/or X2 interface information; and (4) configuring or updating the interface information of the neighboring RAN node according to the received S1 and/or X2 interface information.

Alternatively, when being executed, the program performs these steps.

When handover occurs, the source RAN node reads the stored interface handover table, where the interface handover table includes the information indicating whether the handover can be performed through the S1 interface to the target RAN node.

The source RAN node performs handover through the S1 interface if the interface handover table indicates that the handover can be performed through an S1 interface to the target RAN node, or else performs handover through the X2 interface.

Alternatively, when being executed, the program performs these steps.

The source RAN node reads interface information when handover occurs, where: the interface information includes the information about whether an X2 interface exists between the source RAN node and the target RAN node and/or the information about whether an S1 interface exists between the serving core network node of the source RAN node and the target RAN node.

The source RAN node performs handover through an X2 interface if the interface information indicates that an X2 interface exists between the source RAN node and the target RAN node and/or an S1 interface exists between the serving core network node of the source RAN node and the target RAN node, or else performs handover through an S1 interface. The storage medium mentioned above may be a ROM/RAM, magnetic disk, compact disk, and so on.

It is worthy of attention that the judging unit 721, the sending unit 722, and the handover selecting unit 733 in the first embodiment of the RAN node of the present invention may be integrated in one computation processing module; and the receiving unit 731, the processing unit 732, and the handover selecting unit 733 of the RAN node in the second embodiment of the present invention may be integrated in one processing module, or even all units in an embodiment of the present invention may be integrated in one processing module.

Further, it is worthy of attention that the judging unit 721, the sending unit 722, and the handover selecting unit 733 in the first embodiment of the RAN node of the present invention may be hardware or software function modules, and it is the same with the receiving unit 731, the processing unit 732, and the handover selecting unit 733 of the RAN node in the second embodiment. The combination of the foregoing units may be sold or applied as an independent product, or stored in a computer-readable storage medium.

Detailed above are a synchronization method, a communication handover method, a radio network, and a RAN node in an embodiment the present invention. Although the invention is described through some exemplary embodiments, the invention is not limited to such embodiments. It is apparent that those skilled in the art can make various modifications and variations to the invention without departing from the spirit and scope of the invention.

What is claimed is:

1. A communications method, comprising:
   receiving, by a second radio access network (RAN) node, information from a first RAN node, the information received through an interface between the first RAN node and the second RAN node, with the information indicating the first RAN node belongs to a mobility management entity pool, and the information being received in response to the first RAN node determining a condition has been fulfilled for sending the information; and
   performing, by the second RAN node, an operation in accordance with the information.

2. The method of claim 1, with the condition comprising a change in configuration of an interface of the first RAN node.

3. The method of claim 1, with the condition comprising a change in state of an interface of the first RAN node.

4. The method of claim 1, with the condition comprising a restarting of the first RAN node.

5. The method of claim 1, further comprising:
   performing, by the second RAN node, a handover to the first RAN node through the interface between the first RAN node and the second RAN node, with the second RAN node belonging to the mobility management entity pool.

6. The method of claim 1, with the performing comprising:
   storing, by the second RAN node, interface information of the first RAN node in accordance with the received information in response to a lack of interface information of the first RAN node in the second RAN node.

7. The method of claim 1, with the performing comprising:
   updating, by the second RAN node, interface information of the first RAN node in accordance with the received information.

8. A second radio access network (RAN) node, comprising:
   a receiver, configured to receive information from a first RAN node, the information received through an interface between the first RAN node and the second RAN node, with the information indicating the first RAN node belongs to a mobility management entity pool, and the information being received in response to the first RAN node determining a condition has been fulfilled for sending the information; and
   a processor, configured to perform an operation in accordance with the information.

9. The second RAN node of claim 8, with the condition comprising a change in configuration of an interface of the first RAN node.

10. The second RAN node of claim 8, with the condition comprising a change in state of an interface of the first RAN node.

11. The second RAN node of claim 8, with the condition comprising a restarting of the first RAN node.

12. The second RAN node of claim 8, with the processor being further configured to perform a handover to the first RAN node through the interface between the first RAN node and the second RAN node, with the second RAN node belonging to the mobility management entity pool.

13. The second RAN node of claim 8, with the processor being configured to store interface information of the first RAN node in accordance with the received information in response to a lack of interface information of the first RAN node in the second RAN node.

14. The second RAN node of claim 8, with the processor being configured to update interface information of the first RAN node in accordance with the received information.

15. A communications system, comprising a first radio access network (RAN) node and a second RAN node, wherein:
   the first RAN node is configured to send information to the second RAN node through an interface between the first RAN node and the second RAN node, with the information indicating the first RAN node belongs to a mobility management entity pool, and the information being sent from the first RAN node in response to the first RAN node determining a condition has been fulfilled for sending the information; and the second RAN node is configured to receive the information and perform an operation in accordance with the information.

16. The system of claim 15, with the condition comprising a change in configuration of an interface of the first RAN node.

17. The system of claim 15, with the condition comprising a change in state of an interface of the first RAN node.

18. The system of claim 15, with the condition comprising a restarting of the first RAN node.

19. The system of claim 15, wherein the second RAN node is further configured to perform a handover to the first RAN node through the interface between the first RAN node and the second RAN node, with the second RAN node belonging to the mobility management entity pool.

20. The system of claim 15, wherein the second RAN node is further configured to update interface information of the first RAN node in accordance with the received information.

* * * * *